United States Patent Office 3,404,588
Patented Oct. 8, 1968

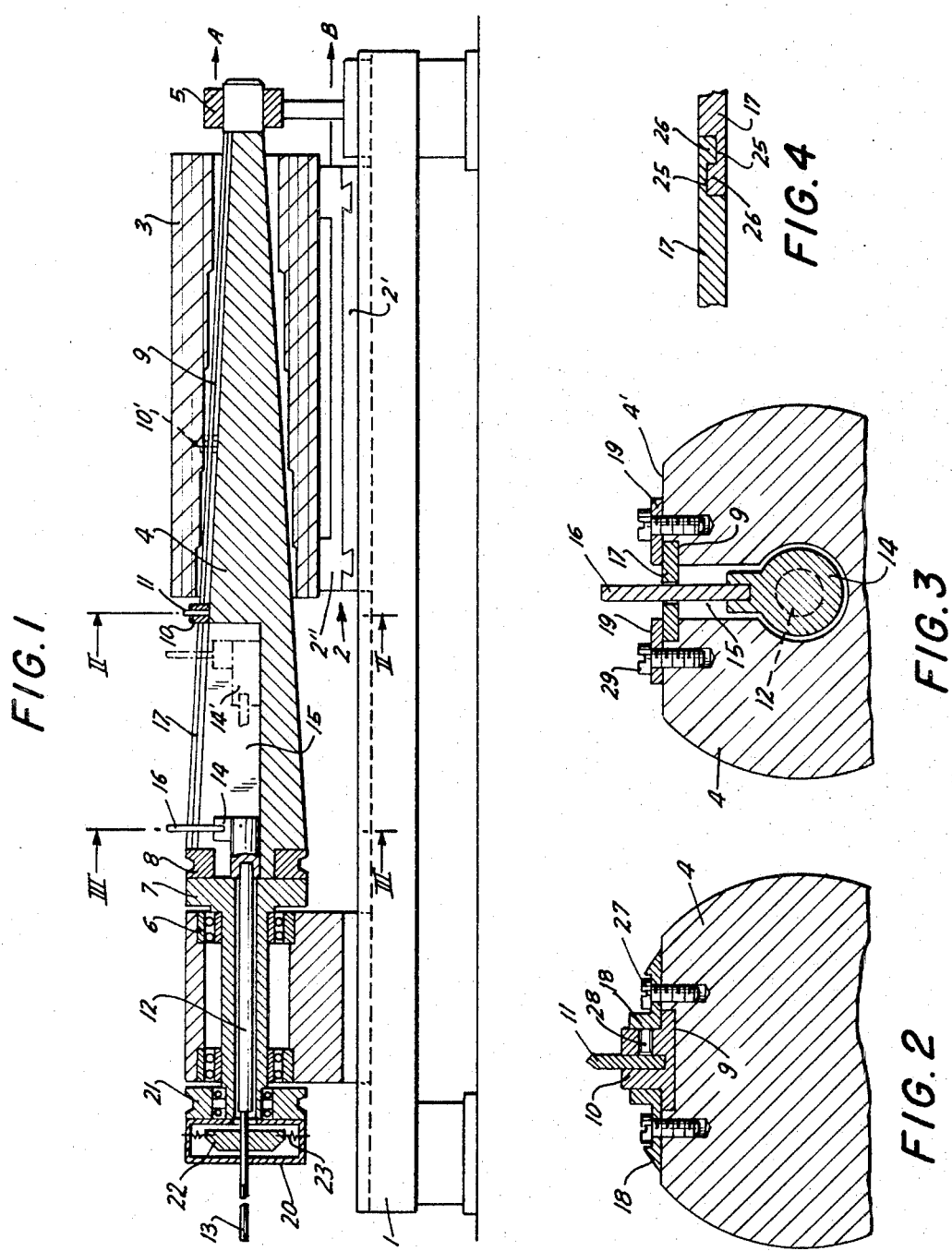

3,404,588
BORING APPARATUS FOR CONICAL BORES
Anton Anger, Linz, Austria, assignor to PME Holding
A.G., Zurich, Switzerland
Filed Apr. 22, 1966, Ser. No. 544,485
Claims priority, application Switzerland, Feb. 3, 1966, 1,552/66
14 Claims. (Cl. 77—57)

ABSTRACT OF THE DISCLOSURE

A boring apparatus for conical bores in which a conical boring bar rotatable about its axis is provided with a shallow, longitudinally extending groove in the region of its outer conical surface in which a holder of a boring tool is guided and moved in longitudinal direction of the bar while the latter is rotated about its axis so that the boring tool may move during its movement in longitudinal direction of the bar and rotation of the latter toward the axis of the bar to thereby machine a conical bore in a workpiece surrounding the bar.

---

The present invention relates to a boring apparatus for forming conical bores in workpieces.

It is an object of the present invention to provide for a boring apparatus of the aforementioned kind which is extremely rigid in construction so that conical bores may be machined therewith to very close tolerances.

It is an additional object of the present invention to provide for a boring apparatus of the aforementioned kind which is composed of relatively few and simple parts so that the boring apparatus may be manufactured at reasonable cost and will stand up trouble-free under extended use.

With these objects in view, the boring apparatus according to the present invention for forming conical bores in a workpiece basically comprises support means, a conical boring bar mounted on said support means turnably about its axis, a turning tool, a tool holder mounted on the boring bar and carrying said turning tool projecting in substantially radial direction from the boring bar, guide means on the outer conical surface of the boring bar for guiding said tool holder and the tool carried thereby in longitudinal direction of the bar along said surface, moving means cooperating with said tool holder for moving the latter in the aforementioned direction, and means connected to the boring bar for rotating the latter about its axis.

The aforementioned moving means include entrainment means movable in axial direction of the boring bar, and according to a further development of the present invention the moving means include also shifting means for moving the entrainment means along an active stroke in axial direction which is a fraction of the stroke through which the tool holder and the tool carried thereby move during the boring operation. This arrangement includes further transmission means between the entrainment means and the tool holder for moving the latter in one direction and these transmission means may include a plurality of rigid bars successively insertable between the entrainment means and the tool holder for bridging the gap between these two elements in any relative position of the same to each other so as to move the tool holder through consecutive distances in one direction during each axial stroke of the entrainment means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an axial cross section through the boring apparatus according to the present invention;

FIG. 2 is a partial transverse cross section taken along the line II—II of FIG. 1, viewed in the direction of the arrows and drawn to an enlarged scale;

FIG. 3 is a transverse cross section also drawn to an enlarged scale and taken along the line III—III of FIG. 1 and viewed in the direction of the arrows; and FIG. 4 is a partial cross sectional view through adjacent ends of the connecting bars.

Referring now to the drawings, and more specifically to FIG. 1, it will be seen that the boring apparatus of the present invention comprises support means which may include an elongated bed 1 which carries in the region of opposite ends thereof a pair of bearings 5 and 6. The base of the bearing 5 is mounted for instance in a dove-tailed groove of the bed 1 so that the bearing 5 is movable in the direction of the arrow A relative to the bed 1 for a purpose which will be described later on. The elongated bed 1 supports intermediate the bearing 5 and 6 and adjacent to the bearing 5 a second bed 2 having a lower part 2′ movable in direction of the arrow B relative to the elongated bed 1 by being for instance mounted in the aforementioned dove-tailed groove, and an upper part 2″ movable in transverse direction relative to the lower part, for which purpose the lower part 2′ may be provided with a pair of dove-tailed grooves as schematically shown in FIG. 1 in which corresponding projections on the upper part 2″ are slidably guided. The upper part 2″ is provided with means of any known construction for holding a workpiece 3 fixedly thereon.

The bearings 5 and 6 support a substantially conical boring bar 4 for rotation about the axis thereof. The boring bar 4 extends with a portion thereof through a stepped bore provided in the workpiece 3. By removing the bearing 5 in direction of the arrow A from the bed 1, the workpiece 3 may be slipped over the right end, as viewed in FIG. 1 of the boring bar.

A flat surface 4′ is provided on the outer surface of the conical boring bar, and the flat surface 4′ extends in longitudinal direction of the bar 4 inclined to the axis of the latter according to the cone angle of the boring bar. A groove 9 of substantially rectangular cross section extends from the flat surface 4′ into the boring bar 4 and the groove 9 receives the base of a toolholder 10 slidably guided therein for movement in longitudinal direction of the bar 4. The toolholder 10 is provided with a portion projecting from the base thereof, in the manner as best shown in FIG. 2, and this portion is formed with a central slot in which a boring tool 11 is arranged projecting with its cutting edge beyond the toolholder 10 and held in the latter by means of a clamping screw 28, as clearly shown in FIG. 2. The guide means for guiding the toolholder 10 movable in longitudinal direction of the boring bar 4 include further a pair of cover strips 18 overlapping respectively opposite lateral portions of the base of the toolholder 10 and being fastened to the boring bar 4 by screws 27. A drive pulley 8 is coaxially fixed to the large diameter end of the boring bar 4 in any convenient manner and the pulley 8 is driven for instance by a belt, not shown in the drawing, from drive means, likewise not illustrated in the drawing. The drive means may drive the pulley 8 and the boring bar 4 connected thereto at constant speed about its axis, or the drive means may also be adjustable so as to regulate the speed with which the boring bar 4 is rotated about its axis.

A trunnion 7 projects from the left end, as viewed in FIG. 1, of the boring bar 4 fixedly connected thereto in any convenient manner and the trunnion 7 is turnably mounted in the bearing 6. The trunnion 7 is formed with an axial bore therethrough through which a rod 12 extends projecting with the left end thereof, as viewed in FIG. 1, beyond the trunnion 7 and being provided on the projecting end portion with a screw thread 13. A portion of the conical boring bar 4 located between the large diameter end thereof and an intermediate diameter is formed with an axial bore aligned with the bore through the trunnion 7 and a radial slot 15 extends between the aforementioned groove 9 and the axial bore through the aforementioned portion of the boring bar, as best shown in FIG. 3. The slot 15 together with the axial bore through a portion of the boring bar 4 serves to receive entrainment means which include a slide member 14 and a pin 16 fixed to the slide member 14 and projecting therefrom in radial direction beyond the periphery of the boring bar 4, as best shown in FIG. 3.

A pulley 21 is freely turnably mounted, for instance by a ball bearing, on the end of the trunnion 7 projecting beyond the left side, as viewed in FIG. 1, of the bearing 6. Fixedly connected to the pulley 21 for rotation therewith about its axis is a drive nut 20 which comprises at least two jaws 22 provided at the inner ends thereof with a screw thread meshing with the screw thread 13 provided on the projecting end portion of the rod 12 and being held in engagement with the screw thread 13 by springs 23. The pulley 21 is driven by means not shown in the drawing in one or the opposite direction and the speed of the drive means is preferably also adjustable. During rotation of the pulley 21 and the drive nut 20 connected thereto, the rod 12 is moved, depending on the sense of rotation of the pulley 21, either to the right or the left, since the rod 12 is prevented from rotation due to the guidance of the slide member 14 in the slot 15 in the boring bar 4.

Transmission means in form of at least one elongated bar 17 are provided between the pin 16 fixed to and projecting from the slide member 14 and the toolholder 10 to move the latter during the active stroke of the slide member 14 and the pin 16 connected thereto, that is during movement of the latter towards the right, as viewed in FIG. 1, in the same direction. The bar 17 is formed with an opening therethrough through which the pin 16 extends, as shown in FIG. 3, and the bar 17 is located in the groove 9 formed in the boring bar 4 and guided in this groove by means of two cover strips 19 extending over opposite edge portions of the bar 17 and being held in place by screws 29 as shown in FIG. 3. The right end of the elongated bar 17, as viewed in FIG. 1, abuts against the left end face of the toolholder 10 so that the latter moves together towards the right, as viewed in FIG. 1 during the active stroke of the slide member 14 and the pin 16 connected thereto.

As can be seen from FIG. 1, the active stroke of the slide member 14 and the pin 16 connected thereto, which is limited by the length of the cut out or the slot 15 in the boring bar 4, is only a fraction of the stroke through which the toolholder 10 and the tool 11 carried thereby has to move during the boring operation to finish the conical bore through the workpiece 3. Therefore, after the slide member 14 and the pin 16 carried thereby has moved from a starting position shown in full lines in FIG. 1, to the dash-dotted position 14', the rotation of the pulley 21 and the drive nut 20 connected thereto is reversed so that the slide member 14, the pin 16 connected thereto and the elongated bar 17 are withdrawn towards the left, as viewed in FIG. 1, until the slide member 14 reaches again its starting position shown in full lines in FIG. 1. During this reverse movement of the slide member 14 the toolholder 10 is not moved in axial direction since the right end of the bar 17 is only in abutting relationship with the toolholder 10 and becomes disengaged from the latter during the inactive stroke of the slide member 14. After the slide member 14 has returned to its starting position shown in full lines in FIG. 1, an additional bar 17 is placed in the groove 9 bridging the gap between the right end of the first bar and the left face of the toolholder 10. The pulley 21 and the drive nut 20 connected thereto are then again rotated in a direction in which the rod 12 is moved toward the right, as viewed in FIG. 1, so that the tool 11 is moved for the length of the second active stroke of the slide member 14 again towards the right as viewed in FIG. 1. This procedure is repeated until the tool 11 is moved through the whole workpiece 3 and of course the boring bar 4 is rotated about its axis during each active stroke of the member 14.

To properly connect adjacent ends of elongated bars 17 which are successively placed into the groove 9, each of the bars 17 is formed at least at one end thereof with a transverse slot 25 and a transverse rib 26 adjacent thereto to form a groove and tongue joint as shown in FIG. 4.

The above described arrangement has the advantage that the slot 15 need to be formed only through a portion of the conical boring bar 4 which extends from the large diameter end of the boring bar to an intermediate diameter thereof, whereas the portion of the boring bar which extends from the intermediate diameter to the small diameter end, that is the portion along which the tool 11 moves during its working stroke can be left solid, so that the rigidity of the boring bar 4 is greatly improved and vibration of the latter during rotation thereof greatly reduced, which permits turning of the conical bore in the workpiece 3 to very exact tolerances.

In order to extend the conical boring bar 4 through the preformed stepped bore in the workpiece 3, the bearing 5 is removed in direction of the arrow A from the machine bed 1, the workpiece 3 slipped over the free end of the boring bar 4 and afterwards the bearing 5 is put again in place over the right end, as viewed in FIG. 1, of the boring bar.

Due to the transverse adjustability of the upper part of the bed 2, it is obviously possible to bore a plurality of bores having parallel axes in a workpiece. By reversing the positions of the bearings 5 and 6 on the bed 1 and by properly adjusting the bed 2 it is also obviously possible to bore conical bores in a workpiece which taper in opposite directions. By modifying the mounting of the bearings 5 and 6 on the bed 1 by making the bearings angularly adjustable about an axis normal to the bearing axis and by making at least one bearing adjustable in direction transverse to the elongation of the bed it is also possible to provide for a boring apparatus in which conical bores intersecting each other may be machined.

It will be understood that each of the elements described above, or two or more together, may also find a useful application in other types of boring apparatus for conical bores.

Thus for instance moving means differing from the rod 12 and the drive nut 20 engaging the threaded end 13 of the rod may be provided for moving the slide member 14 along its active and inactive strokes. For instance the slide member 14 could be moved by a hydraulically or pneumatically operated cylinder and piston arrangement or a chain and sprocket drive may also be used to move the slide member 14. It is further obvious that the tool holder 10 could be guided on the boring bar in a different manner as described above.

While the invention has been illustrated and described as embodied in a boring apparatus for forming conical bores, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A boring apparatus for conical bores comprising, in combination, support means; a conical boring bar mounted on said support means turnably about its axis; a turning tool; a toolholder mounted on said boring bar and fixedly carrying said turning tool projecting in substantial radial direction from said boring bar; guide means in the region of the outer conical surface of said boring bar for guiding said toolholder and the tool carried thereby in longitudinal direction of said bar along said surface; moving means operatively connected with said toolholder for moving the latter in said direction; and means connected to the boring bar for rotating the latter about its axis.

2. A boring apparatus as set forth in claim 1, wherein said moving means include entrainment means movable in axial direction of said boring bar.

3. A boring apparatus as set forth in claim 2, wherein said moving means include shifting means for moving said entrainment means through an active stroke in axial direction of said bar which is a fraction of the working stroke through which said toolholder and said tool carried thereby has to move during the boring operation, and including transmission means between said entrainment means and said toolholder for moving the latter in one direction during the active stroke of said entrainment means.

4. A boring apparatus as set forth in claim 3, wherein said shifting means include a rod provided with a screw thread at one end thereof and being connected at the other end thereto to said entrainment means, means mounting said rod projecting from one end of said boring bar movable in axial direction of the latter while being prevented from turning about its axis, and drive nut means threadingly engaging said threaded end of said rod and being turnable about the axis of the latter in one and in an opposite direction.

5. A boring apparatus as set forth in claim 3, wherein said shifting means moves said entrainment means from a starting position through an active stroke in one direction and through an inactive stroke in a direction opposite to said one direction back to said starting position, and wherein said transmission means include a plurality of rigid bars successively insertable between said entrainment means and said toolholder for bridging the gap between said entrainment means and said toolholder each time said entrainment means has returned to said starting position so as to move said toolholder through consecutive distances in one direction during each active stroke of said entrainment means.

6. A boring apparatus as set forth in claim 5 and including groove and tongue joints on adjacent ends of said rigid bars for connecting the same to each other.

7. A boring apparatus as set forth in claim 1, wherein said conical boring bar comprises a first solid portion extending in axial direction between the small diameter end of the conical bar and an intermediate diameter thereof, and a second portion extending from said intermediate diameter to the large diameter end of said bar, said first portion being adapted to extend through a workpiece, said tool-holder and said tool carried thereby moving during the turning operation in one direction from said intermediate diameter toward said small diameter end of said boring bar, wherein said moving means include entrainment means movable between said large diameter end and said intermediate diameter of said boring bar, and including transmission means between entrainment means and the toolholder for moving the latter together with said entrainment means in said one direction.

8. A boring apparatus as set forth in claim 7, wherein said second portion of said boring bar is formed with a cutout extending in axial direction therethrough and in substantial radial direction from the outer surface of said bar beyond the axis thereof, said entrainment means being movable in axial direction in said cutout and being slidably guided therein.

9. A boring apparatus as set forth in claim 8, wherein the axial length of said cutout is only a fraction of the length of said first portion of said boring bar, and wherein said moving means include shifting means for moving said entrainment means from a starting position at said large diameter and through an active stroke in one direction through said cutout and through an inactive stroke in a direction opposite to said one direction back to said starting position, and wherein said transmission means include a plurality of rigid bars successively insertable between said entrainment means and said toolholder for bridging the gap between said entrainment means and said toolholder each time said entrainment means has returned to said starting position so as to move said toolholder through consecutive distances in said one direction during each active stroke of said entrainment means.

10. A boring bar as set forth in claim 9, wherein said guide means include a longitudinal groove extending inwardly from the outer surface of said boring bar and having a portion aligned with and communicating with said cutout and said rigid bars being insertable in said groove to be guided therein.

11. A boring apparatus as set forth in claim 10, wherein said entrainment means include a slide member guided in said cutout for movement in longitudinal direction, and a pin fixed to said slide member and projecting substantially normal to the axis of said boring bar from said slide member.

12. A boring apparatus as set forth in claim 1 wherein said guide means include a longitudinal shallow groove extending inwardly from the outer surface of said boring bar.

13. A boring apparatus as set forth in claim 1, wherein said support means include a bed, a pair of bearings mounted on said bed and turnably mounting said boring bar in the region of opposite ends thereof, at least one of said bearings being mounted on said bed movable in axial direction so as to be disengagable from said boring bar.

14. A boring apparatus as set forth in claim 13, wherein said support means include a second bed mounted on said first mentioned bed movable with respect thereto in at least one direction, and means for mounting a workpiece on said second bed.

References Cited

FOREIGN PATENTS 21,689    2/1915    Great Britain.
160,602    3/1921    Great Britain.

GERALD A. DOST, *Primary Examiner.*